(No Model.)
C. P. FAY.
SURFACE GAGE.
No. 305,515. Patented Sept. 23, 1884.
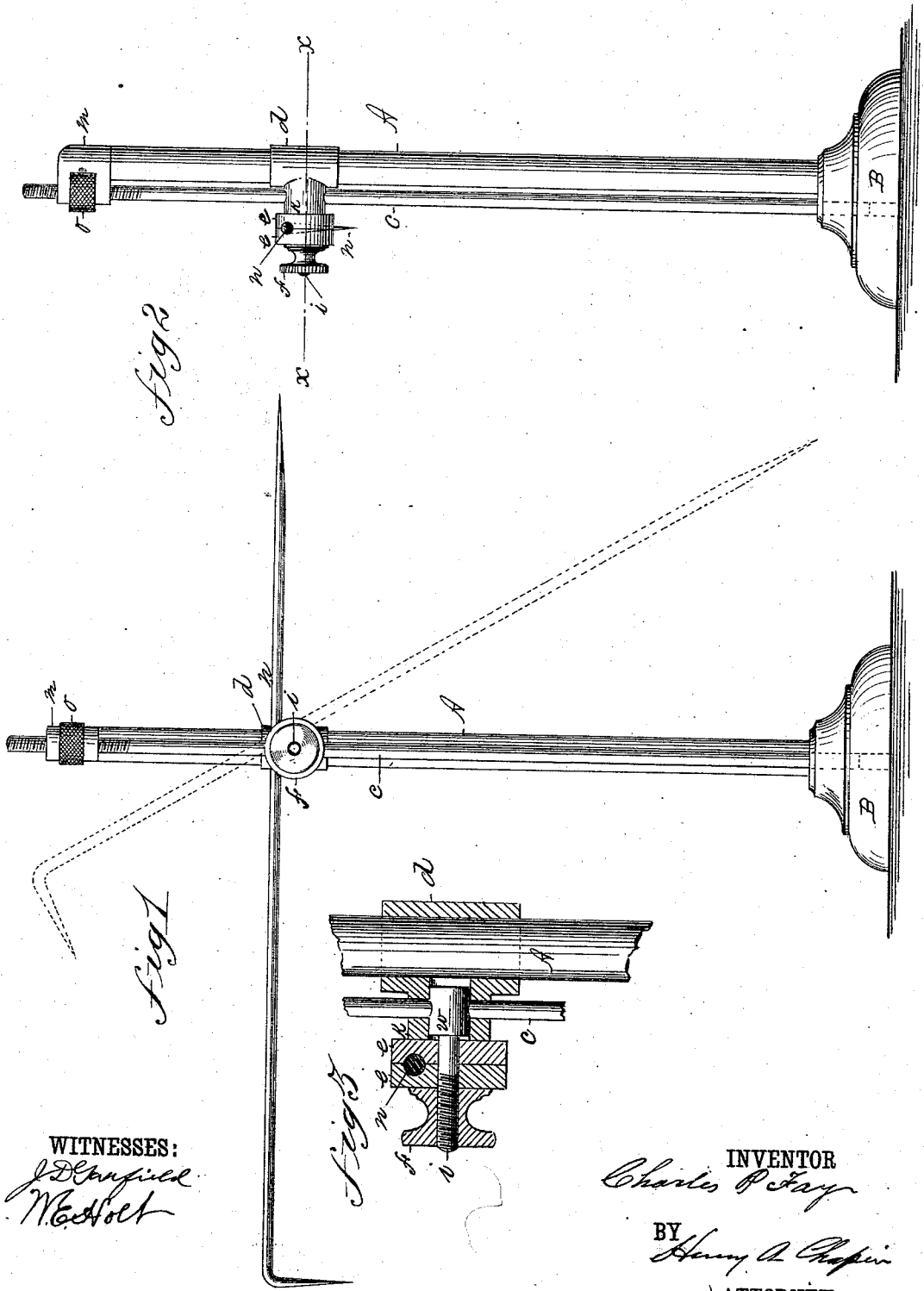

UNITED STATES PATENT OFFICE.

CHARLES P. FAY, OF SPRINGFIELD, ASSIGNOR TO J. STEVENS & COMPANY, OF CHICOPEE FALLS, MASSACHUSETTS.

SURFACE-GAGE.

SPECIFICATION forming part of Letters Patent No. 305,515, dated September 23, 1884.

Application filed May 26, 1884. (No model.)

*To all whom it may concern:*

Be it known that I, CHARLES P. FAY, a citizen of the United States, residing at Springfield, in the county of Hampden and State of Massachusetts, have invented new and useful Improvements in Surface-Gages, of which the following is a specification.

This invention relates to improvements in surface-gages, the object being to provide a tool of this description of a simplified construction, and having improved means for supporting the pointer of the gage, and for delicately adjusting its extremities to the surface of objects.

In the drawings forming part of this specification, Figure 1 is a front elevation, and Fig. 2 a side elevation, partly in section, of a surface-gage constructed according to my invention. Fig. 3 is a sectional view of the pointer-clamping devices in connection with sections of the parts supporting the same.

In the drawings, B is the base of the tool, in which is rigidly fixed the post A, and on the top of the latter is fixed a nut-guide. $m$, open on one side, which projects beyond the side of post A, and a hole is made through said projecting portion to receive the screwed end of the adjusting-rod $c$, which is adapted to move freely up and down by the side of post A, and is held in position by said guide and the entrance of its lower end into a hole in base B, near the post, as shown. A nut, $o$, is fitted on the screwed end of rod $c$ and into the opening on the side of guide $m$, whereby the rod and the parts attached thereto are adjusted vertically.

If preferred, the lower end of rod $c$ may be made to screw into base B, its upper end being left smooth, and provided with a suitable thumb-piece or other suitable means for turning the rod to adjust it, nut $f$ being screwed up a little free.

The support $d$ is placed on post A previous to fixing guide $m$ thereon, and has a hollow branch, K, through which the rod $c$ passes, and is adapted to receive within it the cylindrical head $w$ of the clamp-screw $i$, the latter being perforated transversely to permit rod $c$ to pass through it as well as through the branch K. Two pointer-clamps, $e$ $e$, of disk form, adapted to hold pointer $n$ and turn with it on their pivot-screw, are fitted onto the screw $i$, one of which has a bearing against the end of branch K, and a nut, $f$, on said screw is adapted to be screwed against the other of said disks $e$, whereby they are forced one against the other and against the end of the branch K, and the head $w$ of the screw $i$ is strongly forced against the rod $c$, thus securing the pointer-clamps $e$ $e$ firmly in any position by the side of post A, but subject to vertical adjustment by moving rod $c$, as above described. The clamps $e$ $e$ have a perforation made between their inner adjacent faces, half-round in each one side of their centers, to receive therein the pointer $n$, which is made in the usual form, as shown.

The above-described tool is adapted to be used for surface-gaging as follows: By properly loosening nut $f$ the clamps $e$ $e$ are so freed that pointer $n$ may be moved endwise between them as desired, and at the same time the head of screw $i$ is so freed from its engagement with rod $c$ that the support $d$ and the pointer and the aforesaid clamping devices may be freely moved up or down, as may be desired, and when they and the pointer are brought to proper position, with the end of the latter near the surface to be gaged, nut $f$ is tightly screwed against the clamps $e$, and by turning the nut $o$ rod $c$ is slightly moved up or down until the extreme point of the pointer is nicely adjusted to the said surface.

What I claim as my invention is—

A surface-gage consisting of the pointer $n$, two clamp-disks, between which the pointer is held, a screw having a transversely-perforated head passing through said disks, and a nut thereon next to one of the latter, the post A, provided with a suitable base, a pointer-support to slide up and down on said post, and having a hollow branch to receive the head of said screw, a pointer-adjusting rod located by the side of post A and passing through the said hollow branch and perforated screw-head, and means, substantially as described, for moving said adjusting-rod endwise, combined and operating substantially as set forth.

CHARLES P. FAY.

Witnesses:
H. A. CHAPIN,
J. D. GARFIELD.